(12) United States Patent
Bernardini et al.

(10) Patent No.: US 6,620,572 B1
(45) Date of Patent: Sep. 16, 2003

(54) COMPOSITION SENSITIVE TO IR RADIATION AND TO HEAT AND LITHOGRAPHIC PLATE COATED THEREWITH

(75) Inventors: Roberto Bernardini, Pianoro (IT); Domenico Tiefenthaler, Manerbio (IT); Angelo Bolli, Manerbio (IT)

(73) Assignee: Lastra S.p.A., Mannerbio (IT)

( * ) Notice: Subject to any disclaimer, the term of this patent is extended or adjusted under 35 U.S.C. 154(b) by 0 days.

(21) Appl. No.: 09/628,714

(22) Filed: Jul. 28, 2000

(30) Foreign Application Priority Data

Jul. 30, 1999 (EP) .............................. 99830490

(51) Int. Cl.$^7$ .............................. G03F 7/039
(52) U.S. Cl. .................... 430/270.1; 430/302; 430/348; 430/964
(58) Field of Search .............................. 430/270.1, 348, 430/302, 964

(56) References Cited

U.S. PATENT DOCUMENTS

| | | | |
|---|---|---|---|
| 1,571,447 A | 2/1926 | Huxham | |
| 4,122,235 A | 10/1978 | Dahms | 428/436 |
| 4,468,486 A | 8/1984 | Matsushima et al. | 523/146 |
| 4,568,728 A | 2/1986 | Kopac et al. | 525/504 |
| 5,085,972 A | * 2/1992 | Vogel | 430/270 |
| 6,196,129 B1 | * 3/2001 | Kellett | 101/467 |
| 6,284,433 B1 | * 9/2001 | Ichikawa et al. | 430/303 |
| 6,358,669 B1 | * 3/2002 | Savariar-Hauck et al. | 430/302 |
| 6,461,795 B1 | * 10/2002 | McCullough et al. | 430/270.1 |
| 2001/0036592 A1 | * 11/2001 | Hoshi et al. | 430/270.1 |

FOREIGN PATENT DOCUMENTS

| | | | |
|---|---|---|---|
| EP | 0 823 327 A2 | 2/1998 | |
| EP | 0 903 225 A2 | 3/1999 | |
| WO | WO 97/39894 | 10/1997 | |
| WO | WO 98/54621 | * 12/1998 | G03F/7/32 |
| WO | WO 99/21725 | * 5/1999 | G03F/7/075 |

* cited by examiner

Primary Examiner—Janet Baxter
Assistant Examiner—Barbara Gilliam
(74) Attorney, Agent, or Firm—Oblon, Spivak, McClelland, Maier & Neustadt, P.C.

(57) ABSTRACT

A heat-sensitive composition of the positive type comprising a polymeric binder and a solubility inhibitor, wherein the said solubility inhibitor consists of an organometallic compound, with the exclusion of the metallocenes, an organic salt or an organic complex of an inorganic salt of a metal belonging to the group IIIA or transition group of the periodic system of the elements.

31 Claims, No Drawings

COMPOSITION SENSITIVE TO IR RADIATION AND TO HEAT AND LITHOGRAPHIC PLATE COATED THEREWITH

This application is based on European Patent Application No. 99830490.1 filed on Jul. 30, 1999, the content of which is incorporated hereinto by reference.

FIELD OF INVENTION

The present invention relates to a composition sensitive to IR radiation and to heat, and a lithographic plate coated with this composition.

In particular, it relates to a composition sensitive to IR radiation and to heat which is useful for the production of a lithographic plate of the positive type.

It also relates to a composition sensitive to laser radiation which is useful for the production of a lithographic plate of the positive type.

BACKGROUND OF INVENTION

As is well-known, the technique of printing by means of lithographic plates is based on differential partition between fatty substances and water. The fatty substance or ink is retained preferentially by the image area and the water is preferentially retained by the non-image area. When the surface of a lithographic plate, suitably prepared, is moistened with water and then sprinkled with ink, the non-image area retains the water and repels the ink, while the image area accepts the ink and repels the water. Then, the ink on the image area is transferred onto the surface of a material on which it is desired to reproduce the image, such as, for example, paper, textile and the like.

In general, the lithographic plates used in printing processes are formed from an aluminium support covered with a composition sensitive to light (photosensitive). When such a composition becomes soluble in an alkaline developing bath through the action of heat or of radiation of appropriate wavelength, the printing process is termed "positive". Conversely, when the portion exposed to heat or to radiation of appropriate wavelength becomes insoluble in an alkaline developing bath, the printing process is termed "negative". In both cases, the remaining, image area is lipophilic and hence accepts the ink, while the non-image area is hydrophilic and accepts the water.

The recent developments in the field of lithographic plates have been directed towards the search for compositions sensitive to laser light, preferably in the near IR. In particular, to laser light controlled by software, in such a way as directly to transfer the image created by computer onto the surface of the plate. This technique has the advantage of eliminating the photographic films, with consequent reduction in the pollution due to the chemical substances used for the preparation and production of these and elimination of all the problems that arise in the transfer of the image onto the plate via photographic films.

In the first place, a composition sensitive to radiation emitted by a laser could impart greater reliability to the system.

Secondly, it would be possible to work under ambient illumination, thus eliminating the automatic loading systems or the darkrooms.

With the aim of attaining this objective, in recent years many compositions comprising a polymeric binder and a solubility inhibitor have been investigated. Such a solubility inhibitor has the ability to render the polymeric binder insoluble in a suitable alkaline developing bath as long as it has not been exposed to a sufficient quantity of heat and of then rendering it soluble in the said developing bath after such exposure to heat. Besides the aforesaid components, many of the compositions described until now also comprise a so-called IR absorber, usually consisting of a compound capable of absorbing IR radiation and of transforming part of the radiation absorbed into heat, giving it up to the immediately surrounding environment.

OBJECTS OF INVENTION

The present invention aims to provide a composition sensitive to heat and a lithographic plate of the positive type coated with the said composition wherein the solubility inhibitor consists of an organometallic compound, excluding the metallocenes, or an organic salt of a metal of the group IIIA or transition group of the periodic chart of the elements.

The present invention also aims to provide a composition sensitive to IR radiation and a lithographic plate of the positive type coated with the said composition wherein the solubility inhibitor consists of an organometallic compound, excluding the metallocenes, or an organic salt of a metal of the group IIIA or transition group of the periodic chart of the elements.

The present invention further aims to provide a composition sensitive to laser radiation and a lithographic plate of the positive type coated with the said composition wherein the solubility inhibitor consists of an organometallic compound, excluding the metallocenes, or an organic salt of a metal of the group IIIA or transition group of the periodic chart of the elements.

DEFINITIONS

The term "metallocenes" is used to mean metallorganic compounds, named also sandwich compounds, formed by two cyclopentadienyl groups bound to a metal atom.

The term "lithographic plate" means a support covered with a coating which, after being suitably exposed and developed, is used, as a planographic matrix, in printing processes wherein there is differential partition between fatty substances and water.

Typical examples of support materials are constituted by plates of aluminium, zinc, copper, polyester and paper covered with a polymer. Preferably, the support is a sheet of grained aluminium, oxidized and suitably treated to receive the photosensitive composition.

The term "positive type" means that the portion of the photosensitive coating exposed to the radiation or to heat becomes soluble in such a way that it can be removed during the process of development of the plate. Typically, the development process is performed in alkalis having a conductivity of from 75 to 110 mS.

The term "polymeric binder" means a polymer soluble in alkali, such as for example a novolac resin, a resol resin, a vinylphenolic resin, derivatives thereof or mixtures thereof.

Typically, a novolac resin is a polycondensation product obtained by reaction in an acidic environment between formaldehyde and phenol and/or m-cresol and/or symmetrical xylenol in a molecular ratio of less than 1 (for example formaldehyde: phenol=1:2). Optionally, the thus obtained compound is variously modified such as, for example, by reaction with amides.

Typical examples of commercial novolac resins are the products LB 6564 (mean ponderal molecular weight=

6000–10,000) and LB 744 (mean ponderal molecular weight=8000–13,000) from the firm BAKELITE (Germany); R 7100 (mean ponderal molecular weight= 8000–10,000) from the firm Rohner; PN 320 (mean ponderal molecular weight=3000–5000) and PN 430 (mean ponderal molecular weight=5000–9500) from the firm Clariant; 010/129/2 (mean ponderal molecular weight= 8700–9700), 010/129/1 (mean ponderal molecular weight= 2200–3200), and 010/127/1 (mean ponderal molecular weight =800–1800), $^{76}/_{159}$ (mean ponderal molecular weight=2900–3900), $^{76}/_{160}$ (mean ponderal molecular weight=2200–3200), $^{76}/_{190}$ (mean ponderal molecular weight=7500–8500) from the firm Rohner.

The term "heat-sensitive composition" means a composition which includes a polymeric binder and has the property of being insoluble in an alkaline developing bath as long as it has not been exposed to a sufficient quantity of heat and of then being soluble in the said bath after such exposure to heat.

The term "solubility inhibitor" means a compound capable of rendering a heat-sensitive composition that contains it insoluble in a suitable alkaline developing bath as long as the said composition has not been exposed to a sufficient quantity of heat and/or laser radiation and of then rendering it soluble in the said developing bath after such exposure to heat and/or laser radiation.

The term "IR absorber" means a compound capable of absorbing IR radiation and of transforming part of the absorbed radiation into heat and giving it up to the immediately surrounding environment. Preferably, such an absorber is soluble in water, ketones, glycols, glycolethers, alcohols, esters and mixtures thereof.

Typical examples of absorbers are the commercial products KF 646, KF 645, KF810, KF 1003, KF 1002, IR HBB 812 and KF 818 from the company Riedel-de Haen/Allied/Signal (Seelze, Germany), the commercial product ADS 830A and ADS 1060A, ADS793EI, ADS798MI, ADS798MP, ADS800AT, ADS805PI, ADS805PP, ADS805PA, ADS805PF, ADS812MI, ADS815EI, ADS818HI, ADS818HT, ADS822MT, ADS838MT, ADS840MT, ADS845BI, ADS905AM,ADS956BGI, ADS1040P, ADS1054P, ADS1050P, ADS1120P from the firm American Dye Source (Varennes, Quebec, Canada), the commercial products YKR-3070, YKR-3082, D99-029 and D99-039 from the firm Yamamoto Chemical Inc., the commercial product Projet 825 LDI from the firm Avecia Limited (ex Zeneca Specialties, Manchester, England). Here, for convenience, the product Projet 825 will be referred to hereinbelow by the abbreviation "Z".

A particularly interesting family of absorbers is that characterized by the following structural formula:

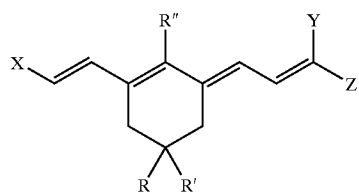

wherein X, Y, R, R' and R" can take many meanings. Typical examples of these meanings are: simple or condensed heterocyclic ring for X, simple or fused heterocyclic ring for Z and Y together with the carbon atom to which they are bound, hydrogen, $C_{1-3}$ alkyl, $SO_3^-$ or $COO^-$ for R and R' independently of one another and H or Cl for R".

Particular examples of the said heterocyclic rings are:

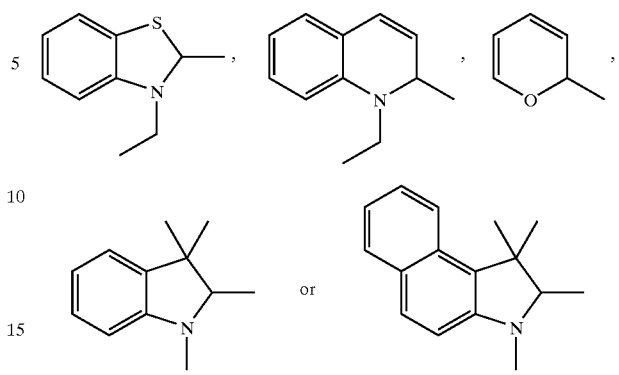

Specific examples of absorbers are:

A
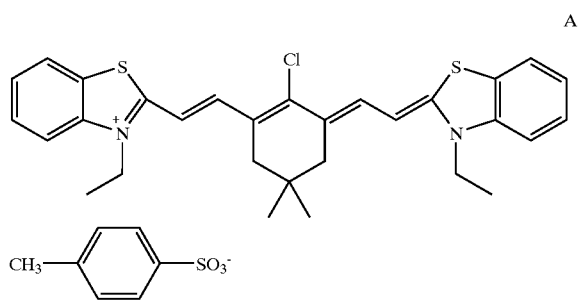

B
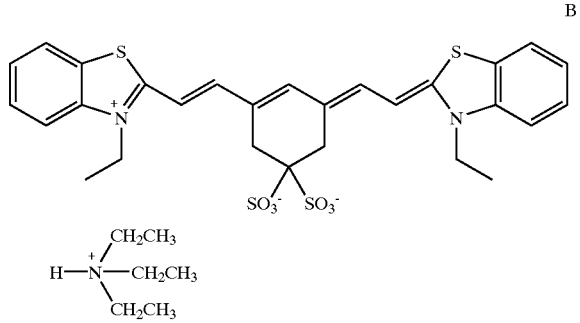

C
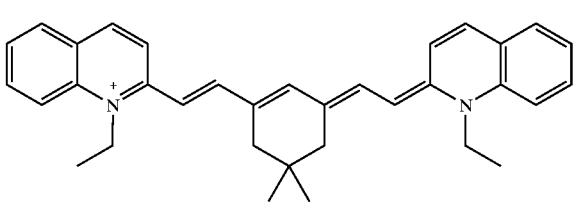

D
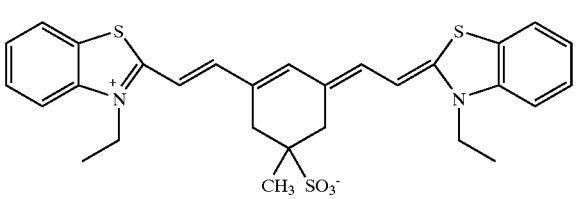

-continued

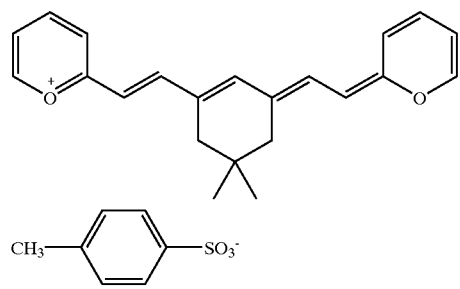

E

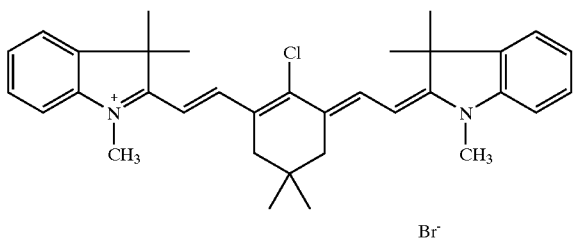

Z

The term "IR radiation" means radiation of a wavelength of from of from 780 to 1400 nm.

A typical example of a device used to generate IR radiation is a laser diode which emits at ca. 830 nm.

The term "laser radiation" means radiation of a wavelength of from 600 to 1400 nm.

Absorber capable of absorbing radiation having a wavelenght of from 600 to 780 nm are well known in the art. Typical examples of such absorbers are the commercial products ADS640PP, AD640HI, ADS640HI, ADS675MT, ADS680BP, ADS740PP, ADS745HT, ADS760MP, ADS775MI, ADS775MP, ADS775HI, ADS775PI, ADS775PP, ADS780MT and ADS780BP from the firm American Dye Source (Varennes, Quebec, Canada).

The term "nominal wavelength" means a wavelength of from 805 to 830 nm.

The term "dye" means a coloured compound or preparation capable of dyeing the photosensitive composition in order to reveal the image after the exposure to light and/or after development.

Typical examples of dyes are Basonyl™ blue 636 (Colour Index 42595) from the firm Basf (Germany), Sudan Yellow 150 (Colour Index 11021) from the firm Basf (Germany), Solvent Green 3 (Colour Index 61565), Solvent Blue 59 (Colour Index 61552), Solvent Blue 35 (Colour Index 61554) or mixtures thereof.

The term "triazine" intends to mean the entire family of the substituted trichloromethyl-s-triazines of known type.

The term "additive" means a compound used to improve or confer a desired property on the photosensitive composition such as for example an enhancer developing agent, a pigment, a plasticizer capable of rendering the emulsion less resistant to heat and hence more sensitive, without however having an insolubilizing function, or an agent capable of modifying the surface and/or interfacial tension and thus improving the spreadability characteristics on the support and the covering power of the heat-sensitive composition.

Typical examples of pigments are: Heliogen™ Blue L 6700 F (PB 15:6 colour index 74160), Heliogen™ Blue L 6875 F (PB 15:2 colour index 74160) from the firm Basf (Germany), and from the Waxoline™ series: BLUE AP FW (colour index SB 36 PART 2 61551), VIOLET A FW (colour index SV 13 PART 2 60725), GREEN G FW (colour index SB 3 PART 2 61565) from the firm Avecia Limited (ex Zeneca Ltd.) or mixtures thereof.

Typical examples of agents capable of modifying the surface and/or interfacial tension are the copolymers dimethylpolysiloxane-modified polyethers, mixtures of high-boiling aromatic solvents, ketones and esters and fluorinated surfactants. Typical examples of such agents are the commercial products BYK 300, 302 and 341, BYKETOL™ OK from the firm BYK Mallinckrodt and FC 430 and FC 431 from the firm 3M.

SUMMARY OF INVENTION

In a first aspect, the present invention relates to a heat-sensitive composition of the positive type comprising a polymeric binder and a solubility inhibitor, characterized in that the said solubility inhibitor is a organometallic compound, an organic salt or an organic complex of an inorganic salt of a metal of the group IIIA or transition group of the periodic chart of the elements, provided however that solubility inhibitor is not a metallocene.

In a second aspect, the present invention also relates to a lithographic plate of the positive type coated with a heat-sensitive composition comprising a polymeric binder and a solubility inhibitor, characterized in that the said solubility inhibitor is a organometallic compound, an organic salt or an organic complex of an inorganic salt of a metal of the group IIIA or transition group of the periodic chart of the elements, provided however that solubility inhibitor is not a metallocene.

In a third aspect the present invention relates to a laser-sensitive composition of the positive type comprising a polymeric binder and a solubility inhibitor, characterized in that the said solubility inhibitor is a organometallic compound, an organic salt or an organic complex of an inorganic salt of a metal of the group IIIA or transition group of the periodic chart of the elements, provided however that solubility inhibitor is not a metallocene.

In a further aspect the present invention relates to a lithographic plate of the positive type coated with a laser-sensitive composition comprising a polymeric binder and a solubility inhibitor, characterized in that the said solubility inhibitor is a organometailic compound, an organic salt or an organic complex of an inorganic salt of a metal of the group IIIA or transition group of the periodic chart of the elements, provided however that solubility inhibitor is not a metallocene.

Typically, the metal of group IIIA is aluminium and boron and of the transition group is titanium(IV), iron(III), copper (II), chromium(III), cobalt(II), manganese(II), tungsten(IV), vanadium, zinc and zirconium.

The preferred metals are titanium(IV), copper(II) and iron.

Depending on the number of valences of the above mentioned metals the said metallorganic compounds preferably comprises at least 1 organic moiety selected from the group comprising aliphatic groups having from 1 to 10 C atoms and cycloaliphatic groups having from 3 to 6 C atoms.

Still preferably the said aliphatic group is an alkyl, alkoxyl or alkylcarboxyl group having from 1 to 10 C atoms.

Typical examples of aluminium organic compounds are aluminium acetate, aluminium acetilacetonate, aluminium isopropoxide, aluminium tri-sec-butoxide, diethyl aluminium chloride, diethyl aluminium ethoxide, diisobutyl aluminium hydride and triisobutyl aluminium.

Typical examples of boron organic compounds are triisopropyl borate, tributyl borate, triethyl borane, triethyl borate, bromodimetyl borane, triphenyl borane, B-methoxy diisopino camphenyl borane, DIP-chloride, B-chloro diisopino camphenyl borane, B-bromocathecol borane, 2-bromo-1,3,2-benzodioxaborole and bromo dimethyl borane.

Typical examples of titanium(IV) organic compounds are titanium(IV) isopropoxide (tetraisopropyl orthotitanate), titanium(IV) propoxide (tetrapropyl orthotitanate), titanium (IV) butoxide (tetrabutyl titanate), titanium(IV) ethoxide (tetraethyl orthotitanate), titanium(IV) 2-ethylhexoxide (tetrakis (2-ethylhexyl) orthotitanate), titanium(IV) methoxide (tetramethyl orthotitanate), titanium diisopropoxide bis (acetylacetonato) and titanium(IV) (triethanolaminato).

Examples of commercial organic compounds of titanium (IV) are Tyzor™ TE, Tyzor™ 131, Tyzor™ GBA, Tyzor™ TPT, Tyzor™ TBT, Tyzor™ TOT and Tyzor™ AA.

Typical examples of organic complexes of an inorganic salt of titanium(IV) are titanium tetrachloride tetrahydrofuran and tetrachlorobis (tetrahydrofuran) titanium.

Typical examples of copper(II) organic compounds are copper(II) d-gluconate, copper(II) acetate monohydrate, copper(II) acetate hydrate, copper(II) acetylacetonate, copper(II) 2-ethylhexanoate, copper(II) cyclohexanebutyrate, 2,4 pentanedione copper(II) derivates, copper(II) acetate and copper(II) methoxide.

Typical examples of iron organic compounds are iron(II) d-gluconate dihydrate, iron(III) acetylacetonate, 2,4 pentanedione iron(III) derivatives and iron(II) acetate.

Typical examples of zinc organic compounds are zinc acetylacetonate, zinc acetylacetonate hydrate, zinc acetate, zinc acetate dihydrate, diethylzinc, dimethyl zinc, diphenyl zinc, dichloro-(N,N,N',N')-tetramethylene-diamino zinc, zinc bis (2,2,6,6-tetramethyl-3,5-heptanedionate), zinc cyclohexanebutyrate and 3,5-di-tert-butylsalicylic acid zinc salt.

Typical examples of manganese organic compounds are manganese acetate, manganese acetate dihydrate, manganese acetate tetra hydrate, manganese acetylacetonate and manganese cyclohexanebutyrate.

Typical examples of zirconium organic compounds are zirconium(IV) butoxide (tetrabutyl zirconate), zirconium tert-butoxide (tetra (ter-butyl) zirconate), zirconium ethoxide (tetraethyl zirconate), zirconium propoxide (tetrapropyl zirconate), zirconium(IV) isopropoxide isopropanol complex, zirconium acetate, zirconium acetate hydroxyde, zirconium(IV) acetylacetonate and 2,4 pentanedione zirconium(IV) derivatives.

Typical examples of vanadium organic compounds are vanadyl isopropoxide, vanadyl acetylacetonate and vanadium(III) acetylacetonate.

Preferably, the said polymeric binder comprises a novolac resin or a derivative thereof having a mean ponderal molecular weight of from 2000 to 14,000.

Advantageously, the said polymeric binder is a mixture of two or more novolacs. Preferably, a first novolac has a mean ponderal molecular weight of from 3000 to 5000 and a second novolac has a mean ponderal molecular weight of from 6000 to 10,000.

In a first preferred embodiment of the present invention, the composition also comprises an IR absorber capable of absorbing IR radiation of from 780 to 1400 nm, preferably from 780 to 1100 nm, and of converting it into heat.

The composition of the present invention can also comprise a dye.

Typically the said dye is Basonyl blue 636 (Colour Index 42595) and is present in quantities sufficient only to dye the composition.

The composition of the present invention can also comprise a plasticizer, a triazine and other additives of a standard nature. In particular, the plasticizer has the purpose of modifying the toughness and the hardness of the said composition by varying its sensitivity to heat without appreciably affecting its sensitivity to the developers.

Advantageously, the composition of the present invention can also contain solubility inhibitors belonging to other classes such as, for example, a hydroxylated acrylic copolymer or a derivative thereof wherein some hydroxyl groups have been esterified with an aliphatic carboxylic acid or a reactive derivative thereof. Such further heat-sensitive solubility inhibitors are the subject of another patent application, which is included here by reference, filed on the same date by the Applicant. Typically, the said hydroxylated acrylic copolymers are Macrynal™ SM 510 N, SM 513, SM 515 or SM 516 from the firm Hoechst or a derivative thereof obtained by partial esterification with maleic anhydride.

The present invention is further described by the following Examples and Tests, which are solely for illustrative purposes and must not be considered to limit the invention.

EXPERIMENTS

EXAMPLE 1

Preparation of Compositions Sensitive to Heat and to IR Radiation

The mixture (6 g) of the components indicated in the following Tables was dissolved at ambient temperature (ca. 25° C.) in 94 g of a 30:70 (w/w) acetone: methoxypropanol mixture, stirring until complete dissolution of the components.

The solution obtained was filtered through paper using a filter of the 0860 type from the firm Schleicher & Schuell (100 mm).

TABLE 1

| | Composition No. | | | | | |
|---|---|---|---|---|---|---|
| | 1 | 2 | 3 | 4 | 5 | 6 |
| | % | % | % | % | % | % |
| Component | (w/w) | (w/w) | (w/w) | (w/w) | (w/w) | (w/w) |
| R7100 | 46.9 | 50.4 | 53.9 | 57.4 | 20.1 | 67 |
| PN 320 | 20.1 | 21.6 | 23.1 | 24.6 | 46.9 | 0 |
| Tyzor ™ TE (*) | 30 | 25 | 20 | 15 | 30 | 30 |
| "Z" | 3 | 3 | 3 | 3 | 3 | 3 |

(*) triethanolaminated titanium isopropoxide

TABLE 2

| | Composition No. | | | | |
|---|---|---|---|---|---|
| | 7 | 8 | 9 | 10 | 11 |
| | % | % | % | % | % |
| Component | (w/w) | (w/w) | (w(w) | (w/w) | (w/w) |
| LB6564 | 67 | 60.3 | 53.6 | 46.9 | 72 |
| PN 320 | 0 | 6.7 | 13.4 | 20.1 | 0 |
| Tyzor ™ TE (*) | 30 | 30 | 30 | 30 | 25 |
| "Z" | 3 | 3 | 3 | 3 | 3 |

TABLE 3

| Component | Composition No. 12 % (w/w) | 13 % (w/w) | 14 % (w/w) |
|---|---|---|---|
| R7100 | 39.9 | 46.9 | 53.9 |
| PN 320 | 17.1 | 20.1 | 23.1 |
| Macrynal ® SM 510 N | 10 | 10 | 10 |
| TYZOR TE | 30 | 20 | 10 |
| "Z" | 3 | 3 | 3 |

TABLE 4

| Component | Composition No. 15 % (w/w) | 16 % (w/w) | 17 % (w/w) |
|---|---|---|---|
| R7100 | 39.9 | 48.9 | 53.9 |
| PN 320 | 17.1 | 20.1 | 23.1 |
| Modified Macrynal ™ (*) | 10 | 10 | 10 |
| Tyzor ™ TE | 30 | 20 | 10 |
| "Z" | 3 | 3 | 3 |

TABLE 5

| Component | Composition No. 18 % (w/w) | 19 % (w/w) |
|---|---|---|
| R7100 | 44.8 | 58.3 |
| PN320 | 22.2 | 24.9 |
| Tyzor ™ TE | 30 | |
| Ti (IV) butoxide | | 13.7 |
| ADS 1060 | 3 | |
| "Z" | | 3 |

TABLE 6

| Component | Composition No. 20 % (w/w) | 21 % (w/w) |
|---|---|---|
| R7100 | 53.9 | 58.8 |
| PN320 | 23.1 | 25.2 |
| Ti (IV) ethylhexoxide | 20 | |
| Ti (IV) propoxide | | 13 |
| "Z" | 3 | 3 |

TABLE 7

| Component | Composition No. 22 % (w/w) | 23 % (w/w) |
|---|---|---|
| R7100 | 46.2 | |
| LB6564 | | 88 |
| PN320 | 30.8 | |
| Basonyl Blu 636 | | 1 |
| Ti (IV) isopropoxide | 20 | 8 |
| "Z" | 3 | 3 |

TABLE 8

| Component | Composition No. 24 % (w/w) | 25 % (w/w) |
|---|---|---|
| R7100 | 62.3 | |
| LB6564 | | 88 |
| PN320 | 26.7 | |
| Ti (IV) isopropoxide | 7 | 8 |
| Basonyl Blu 636 | 1 | 1 |
| "Z" | | 3 |
| ADS 830 | 3 | |

The above mixtures of Tables 1–8 are completely soluble also in the following solvents: methylketone [MEK]; acetone/MEK (5/95 to 95/5 w/w); MEK/2-methoxyisopropanol (5/95 to 95/5 w/w); acetone/isopropylalcohol [IPA] (5/95 to 95/5 w/w); MEK/IPA (5/95 to 95/5 w/w). (*) The modified Macrynal™ was prepared as follows:

Reagents

Macrynal™ SM 510 N[(1)] 32.0 kg (75.24 % w/w)

[(1) Macrynal™ SM 510 N has an OH number of about 160]

Maleic anhydride 2.4 kg (5.64 % w/w)

Hydroquinone 22.5 g (0.053 % w/w)

Triethylamine 108 g (0.25 % w/w)

Butyl acetate 8.0 kg (18.81 % w/w)

Method

Hydroquinone was placed in a 50 l top-loading glass reactor equipped with a mechanical stirrer of 0.45–0.5 kW power with rotating teflon paddle, a 3 l dropping funnel and a reflux condenser. This reactor was also equipped with a heating mantle with double thermocouple control: one placed at the base of the reactor and the other at the top of the heating mantle.

When the addition was complete, the stirrer and the resistors were switched on, setting the heating effect of the first to 78° C. and that of the second to 80° C.

The maleic anhydride was dissolved separately in half of the volume of butyl acetate with heating (50° C.) and stirring, prolonged contact with the air being avoided so as to avoid the moisture contained therein transforming the anhydride to the acid.

When the reactor temperature reached 80° C., the maleic anhydride solution was added over a period of 15 minutes.

The container that had contained the maleic anhydride solution was washed with a portion of the remaining butyl acetate.

Separately, a solution containing the triethylamine and the remaining butyl acetate was prepared, and it was added slowly to the reaction mixture over a period of ca. 1 hour.

When the addition was complete, the temperature of the first resistor was reset to 88° C. and that of the second resistor to 90° C.

The reaction mixture was allowed to react for 5 hours at 90° C. Then the heating resistors were switched off and the reaction mixture was allowed to cool with stirring.

The product thus obtained could be used as such to prepare the composition of the present invention and was mainly composed of the desired esterification product (50–60 % w/w) and of butyl acetate (40–50 % w/w).

The desired esterification product had the following characteristics:

| | |
|---|---|
| Acidity No. | 75 ± 10 mg KOH/g |
| Viscosity (with cup No. 3*) | 200 |

(*) The viscosity was measured by the FORD cup method at 25° C.

EXAMPLE 2

Preparation of a Lithographic Plate of the Positive Type

The compositions of the previous Example 1 were spread on an aluminium support which had previously been treated by standard techniques. The plate thus coated was dried in a forced circulation oven such as the PID system M80-VF from the firm MPM Instruments s.r.l. (Bernareggio, Milan, Italy) at 90° C. for 8 minutes. The weight of the photosensitive coating is 1.5–2.0 g/cm².

After being allowed to stand for at least 24 hours, the plates thus obtained were subjected to the following Tests.

TEST 1

Resistance to a 10% Solution of Sodium Metasilicate Pentahydrate in Demineralized Water A 2×30 cm strip of plate was immersed in successive "steps" of 4 cm/10 sec in a graduated cylinder containing the 10% sodium metasilicate pentahydrate solution at the temperature of 24° C.

In this way, a scale made up of six zones with immersion times of 10 secs for the $1_{st}$ step of the scale up to one minute for the last was obtained. The results are shown in Table 9 below.

TABLE 9

| Composition | Steps | | | | | |
|---|---|---|---|---|---|---|
| | 1 | 2 | 3 | 4 | 5 | 6 |
| 1 | | X | X | | | |
| 2 | X | | | | | |
| 3 | X | | | | | |
| 4 | X | | | | | |
| 5 | X | | | | | |
| 6 | X | X | | | | |
| 7 | X | | | | | |
| 8 | X | | | | | |
| 9 | X | | | | | |
| 10 | X | | | | | |
| 11 | X | | | | | |
| 12 | X | | | | | |
| 13 | X | | | | | |
| 14 | X | | | | | |
| 15 | X | | | | | |
| 16 | X | | | | | |
| 17 | X | | | | | |
| 18 | X | X | | | | |
| 19 | X | | | | | |
| 20 | X | | | | | |
| 21 | X | | | | | |
| 22 | | | | X | | |
| 23 | X | | | | | |
| 24 | X | | | | | |
| 25 | | X | X | | | |

The values indicate the first step visible independently of the thickness of the remaining coating; the value 1 is equivalent to a time of 10 seconds and the value 6 is equivalent to a time of 60 seconds.

The resistance of the composition to the solution used is highest for the value 6 and lowest or zero resistance for the value 1.

TEST 2

Resistance to the Developer LAP98

A 2×30 cm strip of plate was immersed in successive "steps" of 4 cm/10 sec in a graduated cylinder containing a solution of LAP98 at the temperature of 24° C.

The LAP98 had the following composition: water (85% w/w), sodium metasilicate pentahydrate (13% w/w), surfactants (0.5% w/w) and other additives (1.5% w/w).

In this way, a scale made up of six zones with immersion times of 10 secs for the $1_{st}$ step of the scale up to one minute for the last was obtained. The results are shown in Table 10 below.

TABLE 10

| Composition | Steps | | | | | |
|---|---|---|---|---|---|---|
| | 1 | 2 | 3 | 4 | 5 | 6 |
| 1 | | | | | | X |
| 2 | | | | | | X |
| 3 | | | | X | | |
| 4 | X | | | | | |
| 5 | X | | | | | |
| 6 | | | | | | X |
| 7 | | | | | | X |
| 8 | | | | X | | |
| 9 | | X | | | | |
| 10 | X | | | | | |
| 11 | | | | | X | |
| 12 | | | | | | X |
| 13 | | X | | | | |
| 14 | X | | | | | |
| 15 | | | | | | X |
| 16 | | X | | | | |
| 17 | X | | | | | |
| 18 | | | | | X | X |
| 19 | | | | | | X |
| 20 | | | X | X | | |
| 21 | | | | | | X |
| 22 | | | | X | X | |
| 23 | | | | | | X |
| 24 | | X | X | | | |
| 25 | | | | | | X |

The values indicate the first step visible independently of the thickness of the remaining coating; the value 1 is equivalent to a time of 10 seconds and the value 6 is equivalent to a time of 60 seconds.

The resistance of the composition to the solution used is highest for the value 6 and lowest or zero resistance for the value 1.

TEST 3

Resistance to Isopropyl Alcohol

A 2×30 cm strip of plate was immersed in successive "steps" of 4 cm/10 sec in a graduated cylinder containing a 40% aqueous solution of isopropyl alcohol at a temperature of 24° C.

In this way, a scale made up of six zones with immersion times of 1 minute for the $1_{st}$ step of the scale up to 6 minutes for the last was obtained. After the immersion, onto the surface of each strip was applied an adhesive band, which was immediately removed by pulling, in order to evaluate the degree of deterioration of photosensitive layer caused by the solution of isopropyl alcohol. The results are shown in Table 11 below.

TABLE 11

| Composition | 1 | 2 | 3 | 4 | 5 | 6 |
|---|---|---|---|---|---|---|
| 1 |   |   |   |   |   | X |
| 2 |   |   |   |   |   | X |
| 3 | X |   |   |   |   |   |
| 4 | X |   |   |   |   |   |
| 5 | X |   |   |   |   |   |
| 6 |   |   |   |   |   | X |
| 7 | X |   |   |   |   |   |
| 8 | X |   |   |   |   |   |
| 9 | X |   |   |   |   |   |
| 10 | X |   |   |   |   |   |
| 11 | X |   |   |   |   |   |
| 12 |   |   |   |   | X |   |
| 13 | X |   |   |   |   |   |
| 14 | X |   |   |   |   |   |
| 15 |   |   |   | X | X |   |
| 16 | X |   |   |   |   |   |
| 17 | X |   |   |   |   |   |
| 15 |   |   |   |   |   | X |
| 19 |   |   | X |   |   |   |
| 20 |   |   | X |   |   |   |
| 21 |   |   | X |   |   |   |
| 22 |   |   |   | X |   |   |
| 23 | X | X |   |   |   |   |
| 24 |   |   | X |   |   |   |
| 25 |   |   |   |   |   | X |

The values indicate the first step visible independently of the thickness of the remaining coating; the value 1 is equivalent to a time of 1 minute and the value 6 is equivalent to a time of 6 minutes. The resistance of the composition to the solution used is highest for the value 6 and lowest or zero resistance for the value 1.

TEST 4

Exposure to IR Radiation

Six different zones of a plate having the same weight distribution per unit area were exposed using a laser beam, controlled by software and having a nominal wavelength 830 nm (all composition except for composition No. 18) and nominal wavelength 1060 nm (composition No. 18 only), at the following energy values/cm$^2$: 300 mJ/cm$^2$, 250 m$^2$, 150 mJ/cm$^2$, 100 mJ/cm$^2$, 75 mJ/cm$^2$ and 50 mJ/cm$^2$.

The exposed plates were immediately developed in a tray using, as reference, LAP98 from the firm Lastra S.p.A. as developer at a temperature of from 24 to 25° C. for 45 seconds of immersion time with stirring plus 15 seconds of wiping with a cotton pad.

The results of the test are shown in Table 12 and 12 bis.

TABLE 12

| | Cleanness of the Base | | | | | |
|---|---|---|---|---|---|---|
| | A | B | A | B | A | B |
| | 300 | 300 | 250 | 250 | 150 | 150 |
| Composition | mJ/cm$^2$ | mJ/cm$^2$ | mJ/cm$^2$ | mJ/cm$^2$ | mJ/cm$^2$ | mJ/cm$^2$ |
| 1 | yes | yes | yes | no | no | no |
| 2 | yes | yes | yes | yes | no | no |
| 3 | yes | yes | yes | yes | yes | no |
| 4 | yes | yes | yes | yes | yes | yes |
| 7 | yes | yes | yes | yes | no | no |
| 18 | yes | yes | yes | yes | no | no |
| 19 | yes | yes | yes | yes | yes | yes |
| 20 | yes | yes | yes | yes | yes | yes |
| 21 | yes | yes | yes | yes | yes | yes |
| 22 | yes | yes | yes | yes | yes | yes |
| 23 | yes | yes | yes | yes | yes | yes |
| 24 | yes | yes | yes | yes | yes | yes |
| 25 | yes | yes | yes | yes | yes | yes |

TABLE 12bis

| | Cleanness of the Base | | | | | |
|---|---|---|---|---|---|---|
| | A | B | A | B | A | B |
| | 100 | 100 | 75 | 75 | 50 | 50 |
| Composition | mJ/cm$^2$ | mJ/cm$^2$ | mJ/cm$^2$ | mJ/cm$^2$ | mJ/cm$^2$ | mJ/cm$^2$ |
| 1 | no | no | no | no | no | no |
| 2 | no | no | no | no | no | no |
| 3 | no | no | no | no | no | no |
| 4 | yes | yes | yes | yes | yes | yes |
| 7 | no | no | no | no | no | no |
| 18 | no | no | no | no | no | no |
| 19 | no | yes | no | no | no | no |
| 20 | yes | yes | yes | yes | yes | yes |
| 21 | yes | yes | yes | yes | no | no |
| 22 | no | no | no | no | no | no |
| 23 | no | no | no | no | no | no |
| 24 | yes | yes | yes | yes | no | no |
| 25 | no | no | no | no | no | no |

A corresponds to an emulsion weight of 1.6–1.8 g/m$^2$.
B corresponds to an emulsion weight of 2.0–2.2 g/m$^2$.

The term "cleanness of the base" is used to mean that the developer has removed the composition from the regions that have been exposed to laser radiations.

TEST 5

Resistance to Mechanical Abrasion

To simulate the mechanical and chemical abrasion which a plate undergoes during the printing cycle, samples of plates corresponding to the compositions from 1–4 and 7, 18–25 were fixed to a level surface and placed in close contact with a cotton pad soaked in a 50% solution of isopropyl alcohol. The pad was moved by an arm attached to a compressed air system capable of imparting an oscillatory motion with consequent rubbing of the samples under examination. For each composition, the maximum number of passes before the complete removal of the emulsion was recorded. The results expressed in number of passes are reproduced in the following Table 13.

TABLE 13

| Composition | Number of Passes |
|---|---|
| 1 | 100 |
| 2 | 30 |
| 3 | 15 |
| 4 | 5 |
| 7 | 30 |
| 18 | 100 |
| 19 | 70 |
| 20 | 20 |
| 21 | 90 |
| 22 | 100 |

TABLE 13-continued

| Composition | Number of Passes |
|---|---|
| 23 | 60 |
| 24 | 95 |
| 25 | 600 |

What is claimed is:

1. A heat-sensitive composition of the positive type comprising a polymeric binder and a solubility inhibitor, wherein said solubility inhibitor comprises an organometallic compound, a metal carboxylate having from 1 to 10 carbon atoms or an organic complex of an inorganic salt of a metal, wherein said metal is selected from the group consisting of boron, titanium (IV), tungsten (IV) and vanadium, and wherein said solubility inhibitor is not a metallocene.

2. The composition according to claim 1, wherein said solubility inhibitor is an organometallic compound comprising at least one organic moiety selected from the group consisting of aliphatic groups having from 1 to 10 C atoms and cycloaliphatic groups having from 3 to 6 C atoms.

3. The composition according to claim 2, wherein said aliphatic group is an alkyl, alkoxyl or alkylcarboxyl group having from 1 to 10 C atoms.

4. The composition according to claim 1, wherein the solubility inhibitor comprises a compound selected from the group consisting of titanium(IV) isopropoxide, titanium(IV) propoxide, titanium(IV) butoxide, titanium(IV) ethoxide, titanium(IV) 2-ethylhexoxide, titanium(IV) methoxide, titanium diisopropoxide bis(acetylacetonato) and titanium(IV) (triethanolaminato).

5. The composition according to claim 1, wherein the solubility inhibitor is an organic complex of an inorganic salt selected from the group consisting of a complex of titanium tetrachloride with tetrahydrofuran and tetrachlorobis (tetrahydrofuran) titanium.

6. The composition according to claim 1, wherein the solubility inhibitor comprises a compound selected from the group consisting of triisopropyl borate, tributyl borate, triethyl borane, triethyl borate, bromodimetyl borane, triphenyl borane, B-methoxy diisopino camphenyl borane, DIP-chloride, B-chloro diisopino camphenyl borane, B-bromocathecol borane, 2-bromo-1,3,2-benzodioxaborole and bromo dimethyl borane.

7. The composition according to claim 1, wherein the solubility inhibitor comprises a compound selected from the group consisting of vanadyl isopropoxide, vanadyl acetylacetonate and vanadium(III) acetylacetonate.

8. The composition according to claim 1, wherein the polymeric binder comprises a novolac resin.

9. The composition according to claim 1, further comprising an IR absorber capable of absorbing IR radiation of from 780 to 1400 nm.

10. The composition according to claim 1, further comprising a hydroxylated acrylic copolymer or a derivative thereof wherein a plurality of hydroxyl groups have been esterified with a carboxylic acid or a reactive derivative thereof.

11. A laser-sensitive composition of the positive type comprising a polymeric binder and a solubility inhibitor, wherein said solubility inhibitor comprises an organometallic compound, a metal carboxylate having from 1 to 10 carbon atoms or an organic complex of an inorganic salt of a metal, wherein said metal is selected from the group consisting of boron, titanium (IV), tungsten (IV), and vanadium, and wherein said solubility inhibitor is not a metallocene.

12. A lithographic plate of the positive type coated with a heat-sensitive composition comprising a polymeric binder and a solubility inhibitor, wherein said solubility inhibitor comprises an organometallic compound, a metal carboxylate having from 1 to 10 carbon atoms or an organic complex of an inorganic salt of a metal, wherein said metal is a metal of Group IIIA or of the transition group, and wherein said solubility inhibitor is not a metallocene.

13. The lithographic plate according to claim 12, comprising an organic complex of an inorganic salt of a group IIIA metal selected from the group consisting of aluminium and boron.

14. The lithographic plate according to claim 12, comprising an organic complex of an inorganic salt of a transition group metal selected from the group consisting of titanium(IV), iron(II), iron (III), copper(II), chromium(II), cobalt(II), manganese(II), tungsten(IV), vanadium, zirconium and zinc.

15. The lithographic plate according to claim 12, wherein the solubility inhibitor is an organometallic compound comprising at least one organic moiety selected from the group consisting of aliphatic groups having from 1 to 10 C atoms and cycloaliphatic groups having from 3 to 6 C atoms.

16. The lithographic plate according to claim 15, wherein said aliphatic group is an alkyl, alkoxyl or alkylcarboxyl group having from 1 to 10 C atoms.

17. The lithographic plate according to claim 12, wherein the solubility inhibitor comprises a compound selected from the group consisting of titanium(IV) isopropoxide, titanium (IV) propoxide, titanium(IV) butoxide, titanium(IV) ethoxide, titanium(IV) 2-ethylhexoxide, titanium(IV) methoxide, titanium diisopropoxide bis(acetylacetonato) and titanium(IV) (triethanolaminato).

18. The lithographic plate according to claim 12, wherein the solubility inhibitor is an organic complex of an inorganic salt of a transition group metal selected from the group consisting of a complex of titanium tetrachloride with tetrahydrofuran and tetrachlorobis (tetrahydrofuran) titanium.

19. The lithographic plate according to claim 17, wherein the solubility inhibitor comprises a compound selected from the group consisting of copper(II) d-gluconate, copper(II) acetate monohydrate, copper(II) acetate hydrate, copper(II) acetylacetonate, copper(II) 2-ethylhexanoate, copper(II) cyclohexanebutyrate, 2,4 pentanedione copper(II) derivates, copper(II) acetate and copper(II) methoxide.

20. The lithographic plate according to claim 12, wherein the solubility inhibitor comprises a compound selected from the group consisting of iron(II) d-gluconate dihydrate, iron (III) acetylacetonate, 2,4 pentanedione iron(III) derivatives and iron(II) acetate.

21. The lithographic plate according to claim 12, wherein the solubility inhibitor comprises a compound selected from the group consisting of zinc acetylacetonate, zinc acetylacetonate hydrate, zinc acetate, zinc acetate dihydrate, diethylzinc, dimethyl zinc, diphenyl zinc, dichloro-(N,N,N', N')tetramethylene-diamino zinc, zinc bis (2,2,6,6-tetramethyl-3,5-heptanedionate), zinc cyclohexanebutyrate and 3,5-di-tertbutylsalicylic acid zinc salt.

22. The lithographic plate according to claim 12, wherein the solubility inhibitor comprises a compound selected from the group consisting of aluminium acetate, aluminium acetilacetonate, aluminium isopropoxide, aluminium tri-sec-butoxide, diethyl aluminium chloride, diethyl aluminium ethoxide, diisobutyl aluminium hydride and triisobutyl aluminium.

23. The lithographic plate according to claim 12, wherein the solubility inhibitor comprises a compound selected from the group consisting of triisopropyl borate, tributyl borate, triethyl borane, triethyl borate, bromodimetyl borane, triphenyl borane, B-methoxy diisopino camphenyl borane, DIP-chloride, B-chloro diisopino camphenyl borane, B-bromocathecol borane, 2-bromo-1,3,2-benzodioxaborole and bromo dimethylborane.

24. The lithographic plate according to claim 12, wherein the solubility inhibitor comprises a compound selected from the group consisting of manganese acetate, manganese acetate dehydrate, manganese acetate tetra hydrate, manganese acetylacetonate and manganese cyclohexanebutyrate.

25. The lithographic plate according to claim 12, wherein the solubility inhibitor comprises a compound selected from the group consisting of zirconium(IV) butoxide, zirconium ethoxide, zirconium propoxide, zirconium(IV) isopropoxide isopropanol complex, zirconium acetate, zirconium acetate hydroxyde, zirconium(IV) acetylacetonate and 2,4-pentanedione zirconium(IV) derivatives.

26. The lithographic plate according to claim 12, wherein the solubility inhibitor comprises a compound selected from the group consisting of vanadyl isopropoxide, vanadyl acetylacetonate and vanadium(III) acetylacetonate.

27. The lithographic plate according to claim 12, wherein the polymeric binder comprises a novolac resin.

28. The lithographic plate according to claim 12, further comprising an IR absorber capable of absorbing IR radiation of from 780 to 1400 nm.

29. The lithographic plate according to claim 12, further comprising a hydroxylated acrylic copolymer or a derivative thereof wherein a plurality of hydroxyl groups have been esterified with a carboxylic acid or a reactive derivative thereof.

30. An IR-sensitive composition of the positive type comprising a polymeric binder, an IR absorber, and a solubility inhibitor capable of rendering the composition insoluble in an alkaline developing bath before exposure to IR radiation and soluble in said alkaline developing bath after exposure to IR radiation, wherein said solubility inhibitor comprises an organometallic compound, a metal carboxylate having from 1 to 10 carbon atoms or an organic complex of an inorganic salt of a metal, wherein said metal is selected from the group consisting of boron, titanium (IV), tungsten (IV), and vanadium, and wherein said solubility inhibitor is not a metallocene.

31. A lithographic plate of the positive type coated with a heat-sensitive composition comprising a polymeric binder and a solubility inhibitor, wherein said solubility inhibitor comprises an organometallic compound, a metal carboxylate or an organic complex of an inorganic salt of a metal, wherein said metal is a metal of group IIIA or of the transition group selected from the group consisting of titanium (IV), chromium (III), cobalt (II), manganese (II), tungsten (IV), vanadium, zirconium and zinc, and wherein said solubility inhibitor is not a metallocene.

* * * * *

UNITED STATES PATENT AND TRADEMARK OFFICE
CERTIFICATE OF CORRECTION

PATENT NO.     : 6,620,572 B1
DATED          : September 16, 2003
INVENTOR(S)    : Bernardini et al.

It is certified that error appears in the above-identified patent and that said Letters Patent is hereby corrected as shown below:

<u>Title page,</u>
Item [73], Assignee, should read:
-- [73] Assignee:  Lastra S.p.A., Manerbio (IT) --

Signed and Sealed this

Sixth Day of January, 2004

JAMES E. ROGAN
*Director of the United States Patent and Trademark Office*